Figure 1:
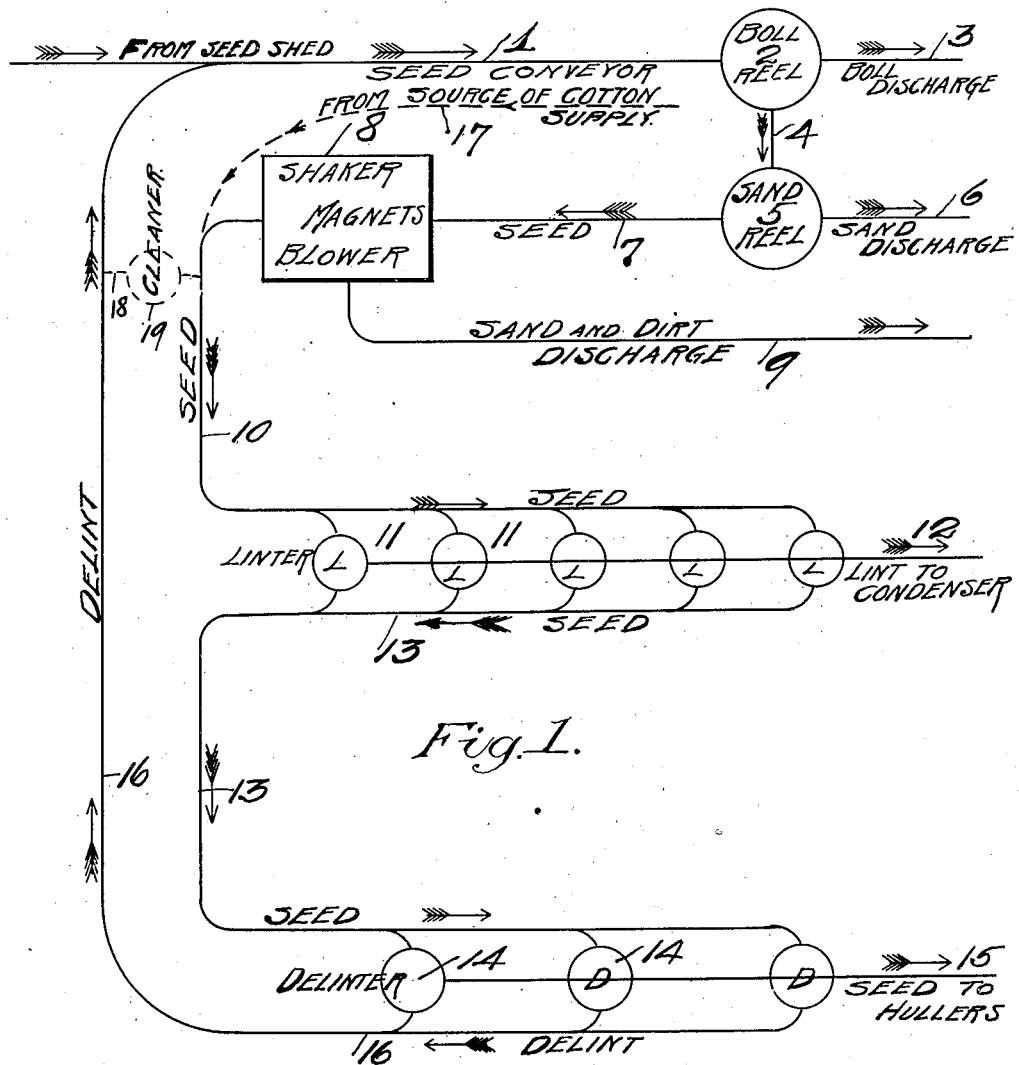

No. 848,611. PATENTED MAR. 26, 1907.
C. H. CASEBOLT.
PROCESS OF DELINTING COTTON SEED LINTERS.
APPLICATION FILED MAY 17, 1904. RENEWED JAN. 24, 1907.

2 SHEETS—SHEET 1.

WITNESSES
INVENTOR

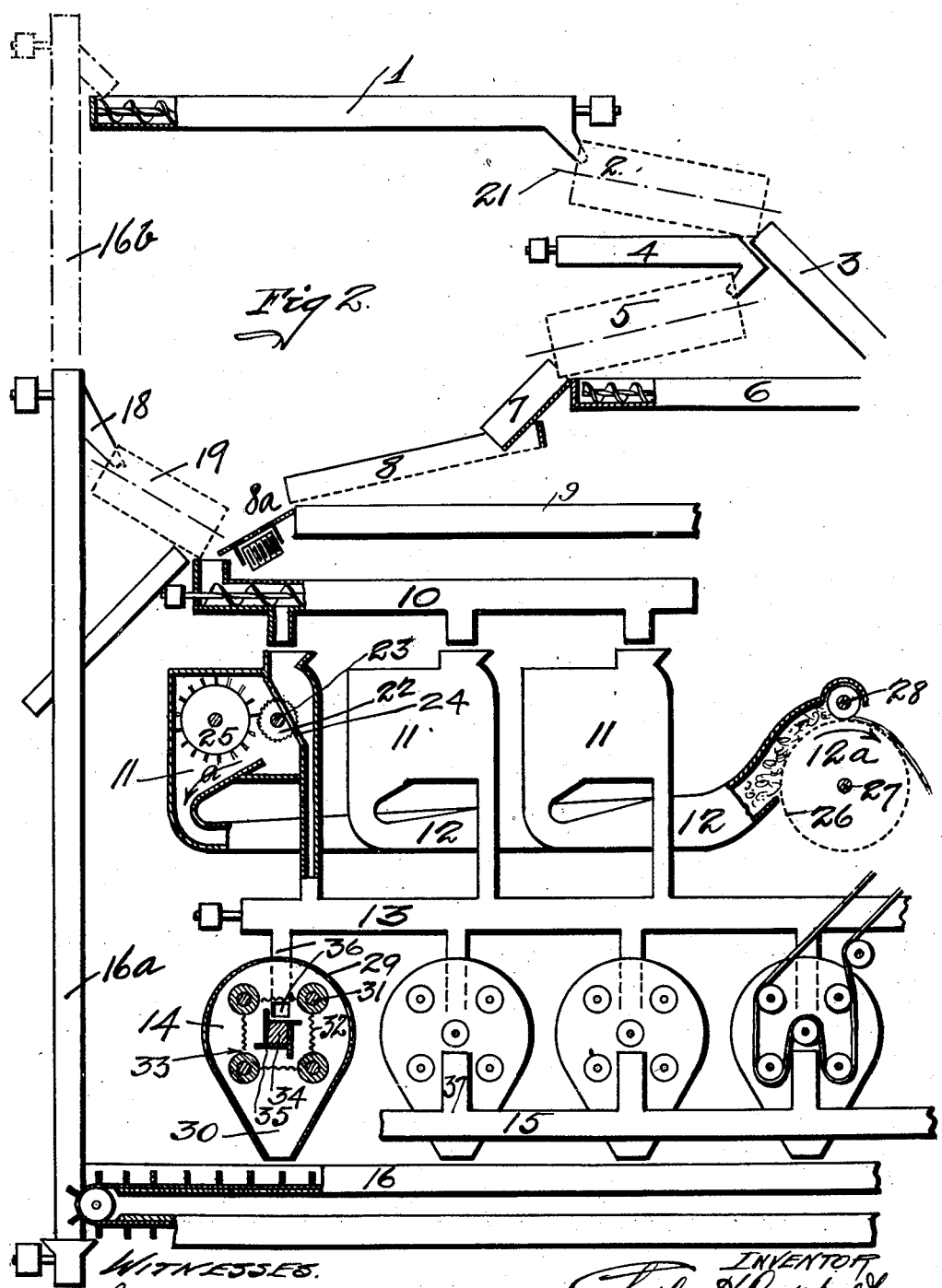

UNITED STATES PATENT OFFICE.

CHARLES H. CASEBOLT, OF COLUMBUS, MISSISSIPPI, ASSIGNOR, BY DIRECT AND MESNE ASSIGNMENTS, OF ONE-HALF TO GRANT BROS. COMPANY, OF MEMPHIS, TENNESSEE, A CORPORATION OF GEORGIA, AND ONE-HALF TO AMERICAN LINTING COMPANY, A CORPORATION OF TENNESSEE.

PROCESS OF DELINTING COTTON-SEED LINTERS.

No. 848,611.          Specification of Letters Patent.          Patented March 26, 1907.

Application filed May 17, 1904. Renewed January 24, 1907. Serial No. 353,905.

*To all whom it may concern:*

Be it known that I, CHARLES H. CASEBOLT, a citizen of the United States, residing at Columbus, Lowndes county, State of Mississippi, have invented certain new and useful Improvements in Processes of Delinting Cotton-Seed, of which the following is a specification.

My invention relates to certain new and useful improvements in the process of extracting cotton-seed, and has especial reference to a process of separating and recovering linters from what is known as "delint."

The object of my invention is to improve what is known as "delint" by straightening it out and eliminating from it the dust and dirt and the extremely short fiber, which is practically valueless. I accomplish this object as will be more fully hereinafter set forth in the drawings, specification, and claims.

In ginning cotton there is a considerable amount of lint left on the seed when they come from the ordinary gins. If the seed are passed directly to the cotton-seed-oil mill and are crushed and pressed, this amount of lint is wasted and that much of the product is lost. It is therefore customary in up-to-date oil-mills to take the seed as they come to the mill and pass them through a modified type of gins, which gins are known to the trade as "linters." The lint secured in this way is baled and sold also under the name of "linters." The seed passing through the linters go to machines which grind off the remaining very short lint, which product is known as "delint," the machines used being known as "delinters." Now in my invention I have taken this product known as "delint" and have carried it back and have put it in with the seed and with them passed it into the machines known as the "linters." These machines with their rapidly-revolving saws whip out the very short fiber, the dust, and motes and straighten the other fiber and mix it with the linters or cotton which they take directly off the seed. They thus to a certain extent card this delint fiber and to a very large extent mix it with the linters, giving a product which is very slightly lower in grade than the best linters and yet which is largely increased in quality and value over the delint which went from the delinters to the linters.

In the drawings, Figure 1 is what is known as a "flow" plan of a cotton-gin or linter and delinter system and shows diagrammatically the path of the materials from the moment they enter the conveyers till they are finally discharged, with the names of the machines ordinarily used written in. Fig. 2 is a diagrammatic view showing the conveyers and other apparatus necessary to carry out my process.

1 is a conveyer which leads from the cotton-gins or seed-shed to the boll-reel 2, which separates out the bolls and discharges them, as indicated, by the chute 3. The seed passes from this reel directly by a conveyer and chute 4 to the sand-reel 5, the dirt being discharged, as shown, by the conveyer 6 and the seed passing out, as shown by the arrow, through a chute or conveyer 7 to the shaker 8 or other cleaning-machines, which removes additional dirt and other undesirable things, discharging them through the chute 9, the seed passing over a magnet $8^a$, through a conveyer 10, to the gins or linters 11. From the gins or linters 11 the lint removed passes through a lint-flue 12 to the condenser $12^a$ and is baled. The seed passes through the conveyers 13 to the delinters 14, from which it is discharged into the conveyer 15, which carries it to the hullers to be hulled and crushed preparatory to pressing or to the storage-room or other receptacle. The usual procedure at present is to collect the delint removed by the delinters 14 and bale it; but the delint so handled is dirty and full of extremely short lint, so that it is of small value and commands an extremely low price. I have found, however, that by cleaning and to some extent carding and separating out the undesirable parts the quality is so much improved as to make the remainder of more value than the original larger quantity. In order to accomplish this, I pass the delint removed by the delinters 14 into a conveyer 16, by which it is carried back to an elevator $16^a$, by which it may be carried, as shown by the dotted extension $16^b$, to the seed-conveyer 1 and passes, with the seed, over and through the same machines, which are very efficient in removing the worthless particles. I have also found that by passing the delint through the gins or linters that their action is to straighten the fiber and eliminate short fiber and foreign matter and to thereby increase the value of the product. It is also possible to accomplish this result by passing the delint separately through screens and shakers and a separate gin or linter. It is much simpler, however, and far more convenient to take the material, convey it back to the seed-conveyer, and carry it through the usual process with the cotton-seed.

In the drawing Fig. 1 I have indicated by the dotted line 17 a conveyer from a source of seed-cotton supply to illustrate that the process can be used without boll or sand reels. In this case, as shown more especially in Fig. 2, the delint from the delinters 14 would pass through the conveyer 16 to the chute 18, through which it would pass to a cleaner or revolving screen 19, and thence directly to the conveyer 10 and as before described.

Referring now especially to Fig. 2, the boll-reel 2 consists of a hollow cylinder of wire-netting revolving about a shaft 21. The mixed bolls and seed are discharged from the conveyer 1 into this reel, and as same revolves the seed drop through the netting, whereas the bolls, being too large to pass through, are carried to the end and are dropped out into the chute 3. The seed which pass through the netting drop into the conveyer 4 and attached chute, by which they are carried to a lower reel 5, known as the "sand-reel." This sand-reel is, like the boll-reel, a cylindrical reel of wire-netting, but of smaller mesh, the mesh being too small to permit the passage of the seed. This reel is revolved and the dirt and sand sifted out through same into a conveyer 6, which carries it away, generally to the outside of the building. The seed pass out at the end of this reel and drop through a chute 7 onto an inclined table 8, known as a "shaker." This shaker is of the ordinary open-top type with a screen for a bottom, and is reciprocated by a mechanism, (not shown,) so that it may shake out any sand or dirt remaining. The conveyers 1, 4, 6, 10, 13, and 15 are ordinarily screw conveyers, as shown by the drawings. The linters 11 consist of a number of fine tooth-saws 22, arranged on an arbor 23, as in an ordinary gin, and passing between ribs 24, which are curved ordinarily as in the regular gins. The lint is brushed off the saws by a revolving brush 25 and from this brush is thrown, as shown by the arrow $a$, into the lint-flue 12, by which it is carried to a condenser $12^a$, which consists, primarily, of a cylindrical reel of wire-netting 26, mounted on a shaft 27 and rotating slowly in the direction of the arrow. Lint in a fluffy state is thrown against this screen, the dust and finer particles passing into the center of same and the cotton being formed into a bat by means of a roller 28, which presses it against the screen 26. The condenser and linter being of the ordinary type and in general use, no further description is believed to be necessary. The delinters 14 may be of any of the numerous types now on the market; but for purposes of illustration in this case they are shown to consist of a casing 29, generally cylindrical in form, but having their lower portion 30 formed with a V-shaped outlet, through which the lint is discharged. Within this casing are cylinders of carborundum or like material 31, which are rotated at a high rate of speed. Between these cylinders are corrugated shields 32, which come close to, but do not quite touch, the said cylinders. The lint ground off by the cylinders is blown through the space 33 thus left and drops out through the bottom of the casing 29. In the center of the casing formed by the cylinders and the partition 32 is a square shaft 34, which has tangentially-projecting blades 35, and which shaft is rotated rapidly in the opposite direction from the cylinders 31. Cotton-seed is introduced at one end of the delinters through the spout 36 and drops onto the plates 35, fastened to the rotating shaft 34, by which they are thrown violently against the partition 32 and the rapidly-revolving cylinders 31, and the delint (or very short lint) is ground off of them. The seed are gradually pushed toward the opposite or front end of the delinter by the pressure of the seed in the chute 36 and eventually pass out into a chute 37 at the front end of the machine, passing thence into the conveyer 15, by which they are removed to the crushes. The lint passing out through the opening 33 drops down through the open bottom of the delinter on the belt conveyer 16, by which it is delivered to the elevator $16^a$ and, as before described, is carried back and mixed with the seed as they go to the linters 11.

It will be distinctly understood that the essence of my invention lies in the process described and not in any particular mechanism by which this is accomplished. It will be readily seen that any type of conveyer which will do the work can be substituted for the type here shown and that any form of linter or delinter may be purchased on the market and used in this process, the essence of the invention being the combining of the linters and the delint and the removal of the dust and extreme short fiber from the same.

Having fully described my invention, what I claim, and desire to secure by Letters Patent in the United States, is—

1. The process herein described of treating cotton-seed delint which consists in dissociating such delint in the presence of additional cotton-seed to open up the mass and straighten the fibers and combine the longer fibers thereof with the linters of said seed.

2. The process herein described of treating the delint obtained from cotton-seed from which the linters have been removed which process consists in introducing said delint into the presence of additional cotton-seed whereby the longer fibers of the delint are caused to combine with the linters of the said cotton-seed.

3. The process herein described of delinting cotton-seed which consists essentially in removing and recovering the linters separate from the seed and its adhering remaining fibers, then removing the said fibers from said seed, and finally recovering the remaining linters from the delint by opening up the mass of delint in the presence of additional cotton-seed from which linters have not been removed whereby the extreme short fibers and foreign matter in the delint are permitted to escape and the longer fibers of the delint are straightened out and combine with the linters of the said cotton-seed.

In testimony whereof I have signed my name to this specification in the presence of two subscribing witnesses.

CHARLES H. CASEBOLT

Witnesses:
J. H. WEATHERFORD,
LEE THORNTON.